May 3, 1966 H. W. COLE, JR 3,248,942
FLOWMETER WITH SPECIFIC GRAVITY COMPENSATOR
Filed Jan. 10, 1961 2 Sheets-Sheet 1
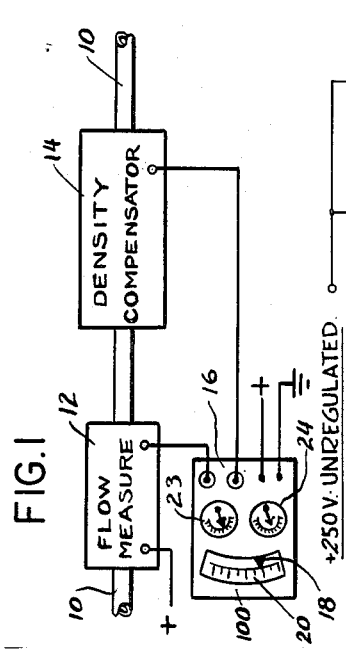
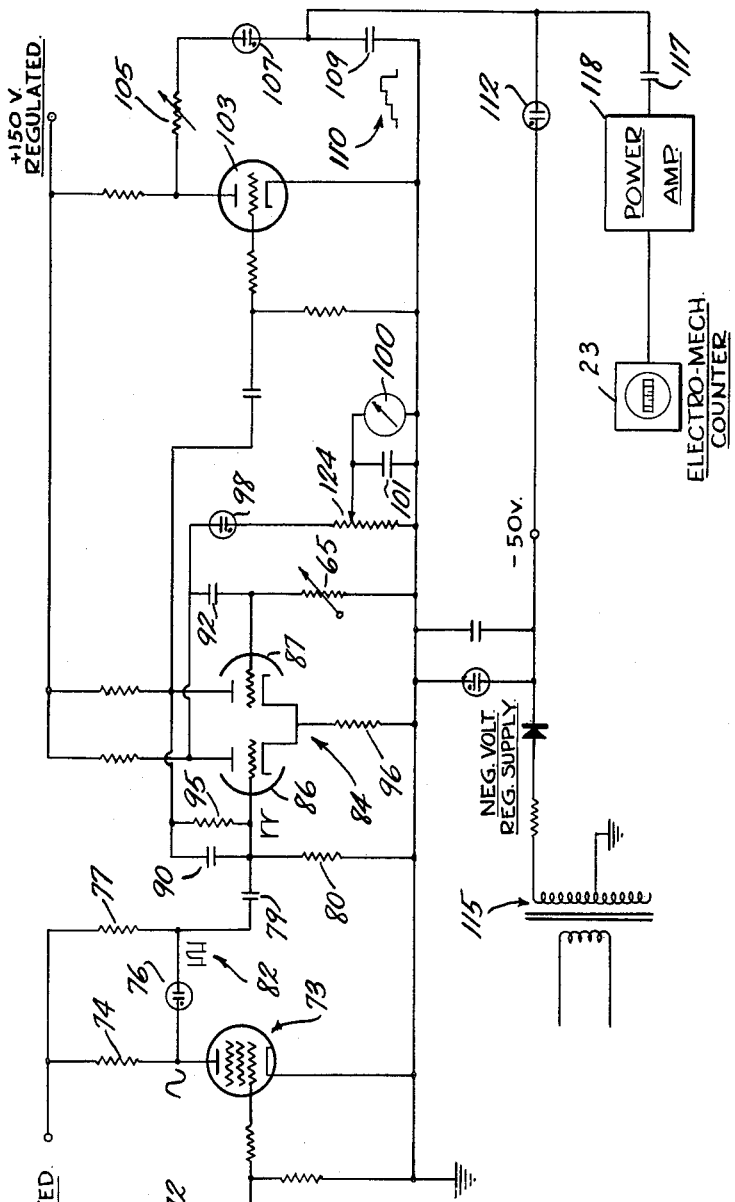
INVENTOR
Howard W. Cole, Jr.
By Emery, Whittemore,
Dunbar & Graham
ATTORNEYS May 3, 1966     H. W. COLE, JR     3,248,942
FLOWMETER WITH SPECIFIC GRAVITY COMPENSATOR
Filed Jan. 10, 1961     2 Sheets-Sheet 2

INVENTOR
Howard W. Cole, Jr.
Emery, Whittemore,
Sandoe & Graham
ATTORNEYS

United States Patent Office 3,248,942
Patented May 3, 1966

3,248,942
FLOWMETER WITH SPECIFIC GRAVITY
COMPENSATOR
Howard W. Cole, Jr., 12 Vale Drive,
Mountain Lakes, N.J.
Filed Jan. 10, 1961, Ser. No. 81,824
3 Claims. (Cl. 73—231)

This application is a continuation-in-part of application Serial No. 241,854, filed August 14, 1951, now Patent No. 2,683,224; and application Serial No. 378,760, filed September 8, 1953, now Patent No. 2,974,525.

One object of this invention is to provide a density-compensated system and method for measuring fluid flow in gravimetric units with a high degree of precision, and another object of the invention is to provide apparatus for precisely measuring specific gravity of fluids and other materials. The novel specific-gravity-measuring apparatus to be described herein is useful per se, and also may, with unique advantages, act as the density-compensating component of the aforementioned system.

It will be understood herein that the term "fluid" is intended to be broad enough to include liquids, gases, material which is partly liquid and partly gaseous, material which is flowable although including small solid or semi-solid particles, or various combinations of the same.

Electronic apparatus is provided for generating a unidirectional voltage proportional to the frequency of oscillation. This voltage may be applied to an indicating voltmeter calibrated to read specific gravity or density, or instead this voltage may be used to provide density compensation of the flow-measuring system.

In still another variation of the specific-gravity-measuring apparatus, there is employed a mechanical arrangement including a relatively large, light body, and a relatively small, dense counterweight, rigidly connected together, suspended from and extending out in more or less opposed positions from an axis on which they may shift position. The body and the counterweight are submerged in the fluid to be tested, and variations in the specific gravity of the fluid will vary their position. A spring is employed in one arrangement in order to improve the linearity of the output and in order to cause the position of the light body and counterweight to be a function of buoyancy only.

Further objects, features, advantages and embodiments of the invention will appear from the more detailed description set forth by way of illustration, which will now be given in conjunction with the accompanying drawings, in which:

FIGURE 1 is a diagrammatic view showing the elements of applicant's combination for determining flow and specific gravity of a fluid;

FIGURE 2 is a diagrammatic view, mostly in a wiring diagram, of apparatus for indicating and totalling the flow that passes through the flow-sensing unit of FIGURE 1; the apparatus being also controlled by the density-compensator;

Figure 5:
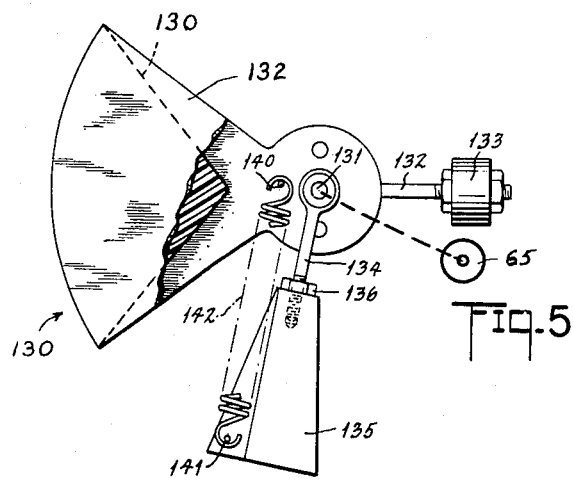
FIGURE 5 is a view, chiefly in elevation, showing a modified construction for measuring the specific gravity of the fluid.

FIGURE 1 shows a pipe 10 through which fluid flows. A flow-measuring apparatus 12, and a density-measuring apparatus 14 are connected in series with the pipe 10. Signals from the measuring apparatuses 12 and 14 are conveyed to an indicator 16 containing the necessary circuits for combining and integrating the signals to obtain an indication by a hand 18 which moves over a scale 20 graduated in terms of gravimetric units per unit of time, and having a counter 23 and another indicator 24 for indicating total flow in terms of volume, for example, cubic feet; or weight, for example, pounds.

The flow-measuring apparatus includes electro-magnetic means adapted to generate a series of voltage pulses at a repetition rate proportional to the speed of rotation of its rotor; for example, a rotor 43 in the pipe 10 rotatable at a rate proportional to the rate of volume flow in the pipe. These voltage pulses are applied to an electronic circuit, for example to the circuit of FIGURE 2 via the leads 55, and the ultimate results are that there are produced indications of the rate of flow on the scale 20 of a meter 100 and total flow on the counter 23. In order that these indications may be in gravimetric units, means are provided for continuously measuring the specific gravity or density of the fluid flowing through the flow-sensing unit 14, and compensating the system for variations in the density. To compensate the system of FIGURE 2 for variations in the density of the fluid, adjustments are automatically made in the value of the variable resistor or potentiometer 65 by the specific-gravity-measuring apparatus, which may be of any type, as will be explained.

The flow-measuring apparatus 12 contains a rotor and electromagnetic means for producing signals proportional to the rate of rotation of the rotor; and this rate of rotation is proportional to the rate of flow of the liquid through the flow-measuring apparatus. Such a construction is shown in FIGURES 1 and 2 of my co-pending application, Serial No. 378,760, filed September 8, 1953, now Patent No. 2,974,525.

Figures 3, 4:
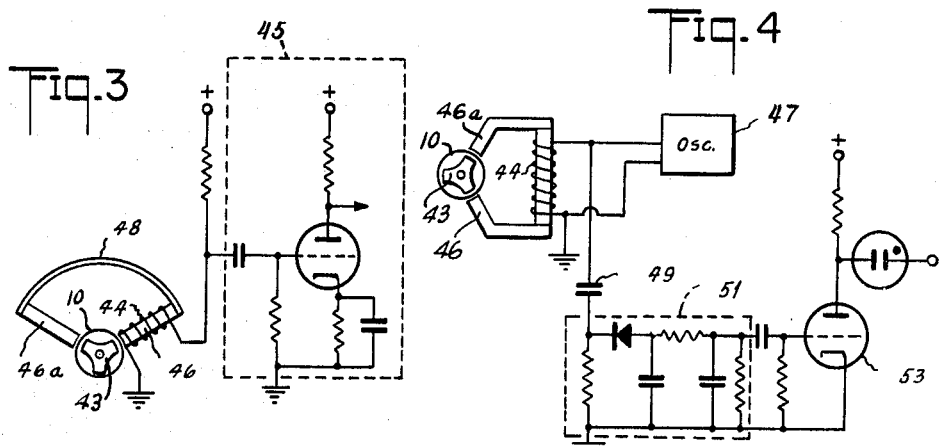
FIGURE 3 is a diagrammatic view of a portion of a flow-sensing unit including a coil energized from a source of unidirectional voltage, together with an arrangement for deriving a variable output voltage therefrom.
FIGURE 4 is a diagrammatic view of another embodiment, illustrating and showing portions of a flow-sensing unit, including a coil energized with an alternating carrier voltage, together with an arrangement for deriving therefrom as an output voltage a modulated carrier, and for detecting the modulation envelope.

Another flow-measuring apparatus is shown in FIGURE 3. In that figure a rotor 43 is located in the pipe and rotates at a rate proportional to the rate of flow of fluid in the pipe. A coil 44 outside of the pipe, but with one end adjacent to the rotor 43, is energized from a source of unidirectional voltage through a load resistor. The pickup coil thus serves a double purpose, in that it provides a magnetomotive force and also serves to generate the output voltage pulses, which are coupled to a succeeding amplifier 45 as shown. A core 46 on which the coil is wound, a core 46a, or the iron band 48, may comprise a permananent magnet, or, since the coil 44 is energized with direct current, it may supply the sole magnetomotive force in the magnetic circuit.

As shown in FIGURE 4, which illustrates still another arrangement, there may be provided a coil 44 in the magnetic path, and an oscillator 47 connected to this coil, for applying to it an alternating carrier voltage having a frequency of, for example, 10 kilocycles. In this arrangement, the magnetic path need include no permanent magnet or electromagnet for providing a unidirectional magnetomotive force. As the armature rotates, it varies the reluctance of the magnetic path for the coil, and consequently the magnitude of the voltage appearing across the coil. It may be assumed that the oscillator has a finite output impedance. The output voltage across the coil 44 will therefore comprise an alternating carrier voltage, amplitude modulated, the modulating envelope having a frequency related to the speed of rotation of the armature. This modulated carrier voltage is applied via a coupling condenser 49 to a detector 51, and thence to the grid of a vacuum tube 53. If the circuit of FIGURE 4 is to be employed for driving the system of FIGURE 2, the tube 53 in FIGURE 4 would be the same as the tube 73 in FIGURE 2.

FIGURE 2 shows the apparatus to which the voltage signals from the flow-sensing unit 12 are supplied to operate the indicating or recording apparatus of the invention. The voltage impulses from the flow-sensing unit are initially supplied to an input amplifier 68 which delivers the amplified signals as pulses of variable amplitude and shape, depending upon the amplitude and shape of the input signal or pulse.

After preliminary amplification in the input amplifier 68, the voltage pulse may have a shape similar to the wave 72 shown in FIGURE 2 at the output side of the amplifier 68. This voltage pulse is supplied to the control grid of a high gain, pentode amplifier tube 73, having a resistor 74 in its anode circuit. Although not shown in the drawing, for simplicity, means are provided for applying suitable bias potentials to the intermediate or screen grid, which is biased to a positive potential, and to the top or suppressor grid, which is biased to cathode potential. A neon tube 76 is connected with the anode of the amplifier tube 73 in the circuit with a current-limiting resistor 77.

The resistor 77 is connected to the same positive voltage source as the amplifier tube 73. Therefore, when the anode voltage drops to the level where the difference between the voltage source and the anode voltage equals the ionization voltage of the neon tube 76, the neon tube will "strike." Likewise when, in response to a change in a grid voltage, the anode voltage of the tube 73 increases so that the voltage difference is less than the operating voltage of the neon tube, the neon tube will extinguish.

A differentiating network consisting of a condenser 79 and resistor 80 completes the pulse shaper. The shape of the voltage pulse beyond the neon tube 76 is illustrated by the wave 82. By making the time constant of the condenser 79 and resistor 80 circuit small, the differentiated signal has an amplitude very nearly equal to that of the operating voltage of the neon tube, and the wave shape is substantially independent of the shape of the voltage pulse on the anode of the amplifier 73. The steep leading edge of this differentiated signal is due primarily to the fast ionization time of the neon tube 76. Thus there is produced a large amplitude, constant shape and size pulse, independent of the size and form of the signal on the plate of the amplifier tube 73. The reason that the preferred embodiment of the invention uses a pentode for the amplifier tube 73 is that in such a tube the anode voltage is relatively independent of the anode current.

The next stage of the circuit contains a "single pulse," multivibrator 84. This multivibrator consists of two voltage amplifier tubes 86 and 87 connected so that the output of one tube is directly coupled to the grid of the other and vice versa. Normally, this arrangement will produce an oscillator having a frequency determined primarily by the time constants of two circuits, one of which includes a condenser 90 and the resistor 80, and the other of which includes a condenser 92 and a resistor comprising the potentiometer 65. However, the illustrated circuit incorporates other resistors 95 and 96 in the circuit to produce a stable state in which the tube 86 is normally conducting and the tube 87 is normally turned off.

The amplification of a negative pulse of proper amplitude and shape instigates one cycle of operation, after which the original stable state is re-established. The length of time that the tube 86 is turned off and the tube 87 turned on can be adjusted by varying the resistance of a potentiometer 65.

A neon tube 98 is connected to the anode of the normally conducting tube 86 and is also connected to the meter 100 and filter 101. This neon tube remains non-conducting so long as the tube 86 is conducting since the anode voltage of the tube 86 is lower than the "strike" voltage of the neon tube. Therefore, when the single pulse multivibrator 84 goes through one cycle of operation, by application of the proper instigating pulse, the neon tube 98 conducts for a period of time determined by the value of the resistance of the potentiometer 65.

Thus the meter 100 receives power for a definite period of time for each input pulse to the control circuit; and the meter indicates proportionately the average rate of input pulses. The multivibrator 84 is an electronic switch means for supplying power to the meter 100 and other equipment, and the potentiometer 65 comprises an adjustable controller for determining the period during which the electronic switch means remain in conducting condition.

The neon tube 98 initially disconnects the meter from the voltage source in the absence of input pulses and thus provides an absolute "zero" stability.

The same single pulse multivibrator 84 is used to supply a pulse of controlled length to operate the totalizing circuits. However, in order to insulate the totalizer from the rate section of the circuit, an intervening amplifier is used. This amplifier comprising a tube 103, has its plate connected through a variable resistor 105 to another neon tube 107. Connected between the ground and the neon tube 107 is a condenser 109.

As each input pulse produces one cycle of operation of the multivibrator 84, a pulse is produced at the plate of the tube 103 so that the neon tube 107 conducts during each cycle for a length of time determined by the setting of the potentiometer 65 in the multivibrator circuit. Therefore, a condenser 109 in the circuit with the neon tube 107 is charged by an amount depending upon the length of time that the neon tube is conducting and by the value of the variable resistor 105. Thus the voltage across the plates of the condenser 109 will increase in the steps in accordance with the voltage diagram 110 as successive input signals are supplied to the circuit.

Between the neon tube 107 and the condenser 109, a conductor leads to another neon tube 112, and the other side of the neon tube 112 is connected to a negative voltage supply 115. As shown in the drawing, this negative voltage supply includes a transformer through which alternating current is supplied to the circuit, a rectifier, and a voltage regulator shunted by a condenser connected between the output of the rectifier and the ground. The voltage regulator and its associated condenser serve to regulate or maintain substantially constant the D.C. output voltage. This regulating of the voltage supply is referred to on the drawing by the legend "NEG. VOLT. REG. SUPPLY." The purpose of this connection is to keep the average voltage across the condenser 109 as low as possible and thus minimize the leakage rate of the condenser which results from internal resistance. When the voltage across the condenser 109 builds up to a sufficient value for the condenser 109 to be discharged through the neon tube 112, a negative pulse is supplied through another condenser 117 to a power amplifier 118 which drives the electromagnetic counter 23 of a type operated by voltage pulses.

Since the sensitivity of the rate indicator 100 and the counting ratio of the counter circuit are controlled by the same device, namely the setting of the potentiometer 65, the invention can be used for fluid flow measurement by connecting it to the specific-gravity compensator 14 in such a way that the movement of the specific-gravity indicator changes the setting of the potentiometer 65 by an amount that compensates for the change in specific gravity. The indicator 100 and totalizer 23 thus provide gravimetric or weight indications. Other variable resistors 124 and 105 are provided in the circuit to adjust the counting ratio and meter sensitivity independently of the movement of the potentiometer 65 of the specific-gravity compensator. This makes it possible to change the calibration of the meter 100 and of the counter 23 so that each number on the counter or meter can be made to represent a unit of flow such as cubic inches per minute, gallons per hour, or pounds per hour, or kilograms per minute, or other units in which it is desirable to have the measurements made.

An apparatus for measuring specific gravity is shown in FIGURE 5. This apparatus is enclosed in a housing which is connected in parallel with the pipe containing the fluid so that only a portion of the fluid flow passes through the housing that encloses the apparatus of FIGURE 5. Within the housing a float 130 is rotatably supported by ball bearings from an axle 131. Connected to the float 130 and extending out in an immediately opposite direction is a support 132 carrying a counterweight 133. It will be understood that the connection between the float and the counterweight is stiff, so that the float and counterweight are parts of a single rigid body, journaled for variable positioning about the axle 131. It is a feature of the arrangement shown in FIGURE 5 that the center of gravity of the float 130 and the center of gravity of the counterweight 133 lie along radii separated by 180°. In FIGURE 5 the float is made of low density material which is lighter than any of the liquids with which the apparatus is intended to be used, and the counterweight is made of material considerably denser than the float. The counterweight 133 is held in position on the support 132 by nuts, as shown.

Rotatably carried on the axle 131 is a support 134, which carries at its lower end a weight 135, this weight being internally threaded and adapted to receive the lower threaded end of the support 134. The position of the weight 135 along the threaded support may be adjusted. The weight is held in position by means of a nut 136.

On the float assembly is a projection 140. Extending from the weight 135 is a projection 141. These projections are adapted to receive a spring 142 which is in tension, and which is constantly urging the float assembly, including its counterweight, in a counter-clockwise direction as shown in FIGURE 5.

The arrangement for deriving an output determined by the position of the float and counterweight includes a a motion-transmitting connection by which the slider of the potentiometer 65 (FIGURE 2) is moved in accordance with changes in the position of the float and counterweight. This is preferably a magnetic motion-transmitting connection so as to transmit motion through the side of the housing without requiring the friction of a stuffing box.

In order to initially balance the apparatus, the spring 142 is removed, and with the assembly of FIGURE 5 in air (rather than submerged in a liquid), the position of the counterweight is adjusted until it balances the float. Next, with the assembly of FIGURE 5 submerged in a reference liquid, and with the spring 142 attached as shown, the tension of the spring is adjusted until the float and counterweight take up a position of balance which is proper for that reference liquid. That is, a certain setting of the potentiometer will correspond to the density of the reference liquid, and the spring tension is adjusted until the float-counterweight assembly is in such a position as to drive the potentiometer to the aforementioned setting.

Any of a variety of means may be employed to adjust the spring tension. For example, the operator may bend one end of the spring slightly to lengthen or shorten it, or means may be provided for adjusting the position of the projection 141, or the spring may be provided with a turnbuckle or other arrangement for adjusting its effective length and hence its tension.

The apparatus is then in condition for use, and the liquid to be tested is supplied to the interior of the housing, instead of the reference liquid. Any difference between the density of the liquid being tested and that of the reference liquid will cause the float-counter-weight assembly to change to a new position of equilibrium.

When the apparatus is stationary, or is not being accelerated, the weight 135 will hang approximately downwardly, but is pulled silghtly to one side by the effect of the spring. The counter-clockwise torque effect of the spring in FIGURE 5 balances the clockwise torque effect caused by the differences in the buoyancy effects of the float and counterweight.

When the apparatus is to be used in a ship or airplane, where there are changes in orientation, a full gimbal mounting may be employed.

In the construction which has been described, the specific-gravity apparatus has provided density compensation for the flow-measuring system of FIGURE 2 by controlling the potentiometer 65 of the circuit. This potentiometer forms a part of the density-compensation apparatus.

Figure 6:
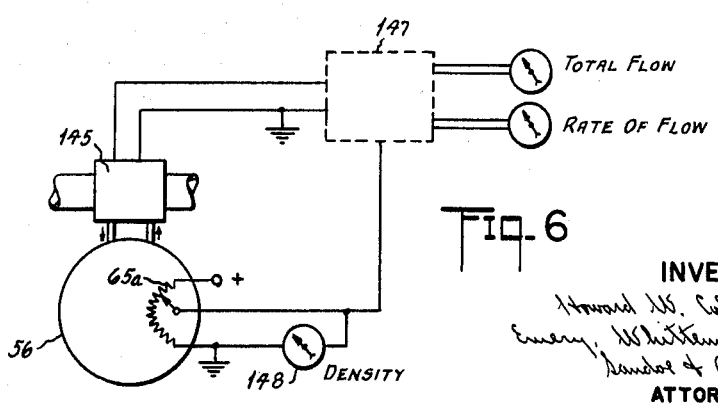
FIGURE 6 is a diagrammatic view of a density-compensator system for measuring and computing the flow of fluid through a pipe in gravimetric units.

FIGURE 6 illustrates schematically a flow-measuring system in which the density compensator provides a controlled unidirectional voltage. In FIGURE 6, the flow-sensing unit indicated by the reference character 145 provides output voltage pulses to the electronic circuit portion of the system, indicated by the rectangle 147, which, in turn, apply output voltage to meters calibrated to read the rate of flow and the total flow, respectively. A sample of the fluid flowing through the pipe is continuously derived from the flow-sensing unit and is supplied to the density compensator, represented schematically by the spherical housing 56. The potentiometer of the density compensator is designated as 65a in FIGURE 6. A unidirectional voltage is applied to this potentiometer. The density compensator will position the slider of the potentiometer in accordance with the density of the fluid being tested, and there will therefore appear on the slider a voltage determined by the density. This voltage is applied to the electronic circuit 147, in order to provide density compensation.

The preferred embodiments of the invention have been illustrated and described, but changes and modifications can be made, and some features can be used in different combinations without departing from the invention as described in the claims.

What is claimed is:

1. A flow-indicating device comprising a section of conduit through which a fluid flows, an impulse generator outside of the conduit and in position to impart a magnetic field across at least a part of the cross section of the conduit, a rotor having a pole thereon and supported by the conduit in said magnetic field and in the path of the fluid, the impulse generator producing signal impulses at a frequency responsive to the rotative speed of the pole of the rotor, an electronic circuit indicating device responsive to the impulses, a control adjustment for the electronic circuit indicating device including an element in the circuit adjustable to change a characteristic of the impulses, and means for operating the control adjustment including a housing in communication with the conduit and containing fluid from the conduit, a float located in the fluid in said housing and resilient means urging the float downward in the fluid, said resilient means yielding in response to upward movement of the float by the greater buoyancy of liquids of higher specific gravity entering the housing from the conduit.

2. A flow-indicating device including a short section of conduit having a rotor therein, and located in the path of fluid flowing through the conduit, an impulse generator operated by the rotor, flow-rate-indicating apparatus responsive to the frequency of impulses from the generator, a housing in communication with the conduit and containing fluid from the conduit, a float located in the liquid in the housing, resilient means urging the float to move in a direction opposite the buoyancy of the float, and a calibration adjustment control connected with the flow-rate-indicating device and operated by movement of the float in response to changes in the specific gravity of the fluid in which the float is located.

3. Apparatus for measuring rate and total flow of a fluid by means of the frequency of electric pulses proportional to the fluid flow, said apparatus comprising means responsive to said fluid flow for generating electric pulses, a pulse converter including an amplifier tube having an anode, a neon tube in the output circuit from the anode of said amplifier tube, a differentiating network comprising a condenser and resistor in the circuit beyond the neon tube, a pulse duration controller including a multi-vibrator having two electronic tubes connected with oscillator circuits but with resistors connected in the circuit of one tube to prevent oscillation of the multi-vibrator and leaving one tube of the multi-vibrator normally conducting and the other non-conducting, a conductor connecting a grid of the normally conducting tube with the output of the neon tube, a voltage supply conductor connected with the normally conducting tube and correlated with the voltage from the other tube so as to interrupt the flow of current through the normally conducting tube and initiate a flow of current through the other tube of the multi-vibrator, a control circuit connected with said other tube of the multi-vibrator and including an impedance that is adjustable to determine the period of current flow through said other tube of the multi-vibrator, a meter for indicating rate of flow, a circuit through which power from said other tube of the multi-vibrator is supplied to the meter, said circuit including a neon tube that operates as an electric switch for providing zero stability to the meter during periods when said other tube of the multi-vibrator is not conducting, an electronic counter, a circuit through which the power impulses from the multi-vibrator are supplied to the electronic counter, said circuit including a neon tube and a condenser which is charged in steps by successive operations of the neon tube in response to power supplied from the multi-vibrator.

References Cited by the Examiner

UNITED STATES PATENTS

| | | | |
|---|---|---|---|
| 1,305,803 | 6/1919 | Irwin | 73—230 |
| 2,221,943 | 11/1940 | Fischer | 73—230 |
| 2,281,214 | 4/1942 | Van Erp | 290—52 |
| 2,299,406 | 10/1942 | Potter | 290—52 |
| 2,529,481 | 11/1950 | Brewer | 73—231 |
| 2,615,328 | 10/1952 | Dolza | 73—32 |
| 2,619,593 | 11/1952 | Malter | 328—210 |
| 2,623,389 | 12/1952 | Van Oosteron | 73—231 |
| 2,656,499 | 10/1953 | Goodwin | 318—28 |
| 2,657,348 | 10/1953 | Jarvis | 318—28 |
| 2,664,742 | 1/1954 | McDonald | 73—32 |
| 2,676,249 | 4/1954 | Crosman | 328—100 |

RICHARD C. QUEISSER, *Primary Examiner.*

ROBERT L. EVANS, DAVID SCHONBERG,
*Examiners.*